(12) United States Patent
High et al.

(10) Patent No.: US 10,600,023 B2
(45) Date of Patent: Mar. 24, 2020

(54) APPARATUS AND METHOD FOR DYNAMIC LAYAWAY INVENTORY MANAGEMENT

(71) Applicant: Walmart Apollo, LLC, Bentonville, AR (US)

(72) Inventors: Donald R. High, Noel, MO (US); Michael D. Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 133 days.

(21) Appl. No.: 15/441,598

(22) Filed: Feb. 24, 2017

(65) Prior Publication Data

US 2017/0255900 A1    Sep. 7, 2017

Related U.S. Application Data

(60) Provisional application No. 62/302,556, filed on Mar. 2, 2016.

(51) Int. Cl.
*G06Q 10/08* (2012.01)
*G06Q 50/28* (2012.01)

(52) U.S. Cl.
CPC ......... *G06Q 10/087* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 6,868,396 B2 * | 3/2005 | Smith | G06Q 10/087 |
| | | | 705/26.9 |
| 8,732,073 B2 | 5/2014 | Thomas | |
| 2006/0155603 A1 | 7/2006 | Abendroth | |
| 2012/0046958 A1 | 2/2012 | Pynadath | |
| 2014/0122269 A1 | 5/2014 | Argue | |
| 2014/0344105 A1 | 11/2014 | Liu | |

(Continued)

OTHER PUBLICATIONS

Jeenjewels; "New JeenJewels Payment Layaway Option", http://www.jeenjewels.com/content/7-payment-layaway, printed Dec. 14, 2015, pp. 1-2.

(Continued)

*Primary Examiner* — Allen C Chein
*Assistant Examiner* — Denisse Y Ortiz Roman
(74) *Attorney, Agent, or Firm* — Fitch, Even, Tabin & Flannery LLP (57) ABSTRACT

Systems, apparatuses, and methods are provided herein for dynamic inventory management. A system for dynamic layaway inventory management comprises a layaway contract database, an inventory database, and a control circuit. The control circuit being configured to periodically: aggregate a plurality of layaway contracts in the layaway contract database to determine convey locations and convey dates for one or more units of an item, determine inventory unit counts of the item at a plurality of item locations based on inventory information stored in the inventory database, determine a layaway reserve unit count for each of the plurality of item locations based on the convey locations and the convey dates for the one or more units of the item and the inventory unit counts of the item at the plurality of item locations, and cause a number of available units of the item to be adjusted based on the layaway reserve unit count.

21 Claims, 4 Drawing Sheets

(56) References Cited

U.S. PATENT DOCUMENTS

2015/0026037 A1* 1/2015 Thompson .......... G06Q 40/025
705/38
2015/0102102 A1* 4/2015 Heim .................. G06Q 10/087
235/382

OTHER PUBLICATIONS

Toysrus; "Toys"R"Us Layaway Program", https://www.toysrus.com/layaway/payment.jsp, printed Dec. 14, 2015, pp. 1-4.

* cited by examiner

APPARATUS AND METHOD FOR DYNAMIC LAYAWAY INVENTORY MANAGEMENT

RELATED APPLICATION

This application claims the benefit of the following U.S. Provisional Application No. 62/302,556 filed Mar. 2, 2016, which is incorporated herein by reference in its entirety.

TECHNICAL FIELD

This invention relates generally to inventory management.

BACKGROUND

Some conventional brick and mortar stores offer installment payment options for customer purchases. To utilize a layaway program, a customer often picks out a specific item, bring it to a layaway service window, and the item is then held in the backroom of the retail store until the item is paid in full by the customer.

BRIEF DESCRIPTION OF THE DRAWINGS

Disclosed herein are embodiments of apparatuses and methods for dynamic layaway inventory management. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for dynamic layaway inventory management. A system for dynamic layaway inventory management comprises: a layaway contract database, an inventory database, and a control circuit communicatively coupled to the layaway contract database, the inventory database, and the plurality of inventory management systems. The control circuit being configured to periodically: aggregate a plurality of layaway contracts in the layaway contract database to determine convey locations and convey dates for one or more units of an item, determine inventory unit counts of the item at a plurality of item locations based on inventory information stored in the inventory database, determine a layaway reserve unit count for each of the plurality of item locations based on the convey locations and the convey dates for the one or more units of the item and the inventory unit counts of the item at the plurality of item locations, and communicate the layaway reserve unit count for each of the plurality of item locations to one or more inventory management systems of the plurality of item locations to cause a number of available units of the item to be adjusted based on the layaway reserve unit count.

Conventionally, the exact merchandise that customers select from a sale floor to place on layaway are stored in a backroom of the store. This type of merchandise storage is often not space-efficient because items placed on layaway do not always stack together well. In some embodiments, methods and systems provide an equivalent item to fulfill a layaway contract at a designed time. The item may be delivered to a store for pick-up or delivered to a customer's home. Conventional layaway storage takes up store space that could be used for other freight. Physical stores also often only offer limited items selection for layaway contracts. With the systems and methods described herein, consumers may place products not offered at their local store on layaway. In some embodiments, for high velocity merchandise, products can be placed into layaway inventory in pallet quantities.

In some embodiments, a consumer may apply for a layaway program through a mobile app, web app, or at a store. When applying to a year round layaway program, a consumer may input personal information, address, payment methods, and other subscription/services (e.g. multi-channel customer loyalty . . . etc.). The consumer may then place items on layaway at a store and/or through a mobile or web app channel. In some embodiments, items that are not currently in stock at a physical store can still be placed on layaway. These out of stock items may be placed into layaway in the closest distribution center, warehouse, and/or fulfillment center. The conventional layaway practices may still be applied in store, but the warehouse and/or fulfillment center may actually carry/store the inventory. In some embodiments, customers may browse items online for the layaway program. A central computer system may check items the customer picks against the stock status of the nearest distribution center, warehouse, and fulfillment center. If the requested items are in stock in those locations, the central computer system may indicate the availability to the customer. In some embodiments, a customer may address terms and conditions of the layaway program when entering into a layaway contract through the online interface. The terms of the layaway agreement may include one or more of: time on layaway, initial down payment, and monthly, weekly, or biweekly payments amounts (which may be based on the initial down payment amount). In some embodiments, if an item is not in stock, the central computer may check the availability of the item outside of the area of the customer. If another distribution center, warehouse, and/or fulfillment center has the product the customer wants, the customer may be offered the option to pay an extra fee to get that product to a closer location to be placed on layaway. This transit change from an outside location to an inside location may enable accurate and quick shipping when the layaway is paid off. In some embodiments, the consumer may link multiple layaway payments method through one account or multiple accounts. The central computer system may organize payments by payment account numbers instead of consumer names and addresses, which allows the consumer to have multiple layaway payments made automatically from one bank account and to have multiple items on layaway at one time. The system may also allow the customer to make payments through a number of available financial channels. In some embodiments, when the conditions of a layaway contract are met, the system may ship the item from the closest warehouse, store, or fulfillment center where the item is available to the customer's designated destination, thereby decreasing the shipping cost.

In some embodiments, the system includes a central computer system with access to surrounding item location inventory information as the consumer browses products online or at the store when setting up the layaway program. The central computer system may be configured to find a location with the item in stock that is closest to a customer designated destination. In some embodiments, the stock availability information may be constantly updated by the central computer system in real time from the warehouses, fulfillment centers, manufacturing locations, and stores to ensure the product is shipped at the least cost from the closest location as inventory moves through the system. In some embodiments, the system may further utilize manufacturing capacity and lead time information. For example, products that can be manufactured/received in time for a layaway pickup event may be made available for ordering even if the products are out of stock at the retailer at the time of the purchase. In some embodiments, through the use of electronically readable tags on layaway merchandise held in various item holding locations and readers operated by associates and/or autonomous units, inventory counts may be monitored at a minimum daily frequency to maintain a high (e.g. 99.999%) inventory accuracy.

Figure 1:
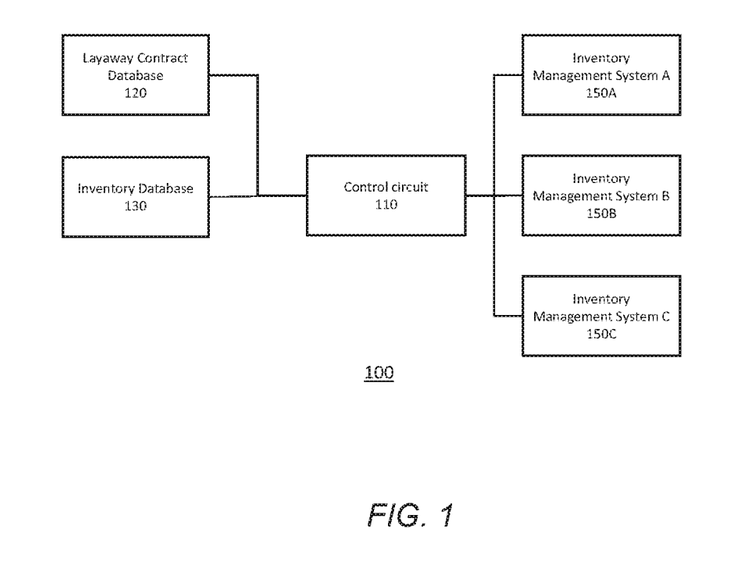
FIG. 1 is a block diagram of a system in accordance with several embodiments.

Referring now to FIG. 1, a system for dynamic layaway inventory management is shown. The system 100 includes a control circuit 110 coupled to a layaway contract database 120, an inventory database 130, and a plurality of inventory management systems 150A-C.

The control circuit 110 may comprise a central processing unit, a processor, a microprocessor, and the like and may be part of a server, a central computing system, a cloud server, and the like. The control circuit 110 may be configured to execute computer readable instructions stored on a computer readable storage memory (not shown). The computer readable storage memory may comprise volatile and/or non-volatile memory and have stored upon it a set of computer readable instructions which, when executed by the control circuit 110, causes the system to determine layaway reserve unit counts for a plurality of items at a plurality of item locations based on the information in the layaway contract database 120 and the inventory database 130. Generally, the computer readable instructions may cause the control circuit 110 to perform one or more steps in the methods and processes described with reference to FIG. 2 herein.

The layaway contract database 120 may comprise computer readable memory and have stored upon it, data associated with a plurality of layaway agreements formed with customers. Each purchase layaway contract in the layaway contract database 120 may include information such as a layaway contract unique identifier, a user identifier, a user account identifier, one or more items selected by the user, a total price for the selected items, a service fee, a total payment paid, an expiration date of the order, a selected convey location, a selected convey date, etc. The total payment to date information may be updated each time the customer submits a payment for the layaway contract. Generally, the expiration date of a layaway contract refers to the date by which a customer must pay for the items in the layaway contract in full to receive the items. If conditions of the layaway contract are not met by the expiration date, the layaway contract may be marked as expired and/or removed from the layaway contract database. In some embodiments, a layaway contract may include other information such as a minimum first payment amount, prices for each of the items selected, one or more shipping addresses, user's preferred physical store, discount codes applied to the order, etc. In some embodiments, the layaway contract database 120 may store layaway contracts from one or more of in-store associate entered layaway contracts, in-store self-service kiosk layaway contracts, online layaway contracts, mobile application layaway contracts, etc.

The inventory database 130 has stored upon, stock information at a plurality of item locations associated with the system. For example, inventory database 130 may store the item quantity information for a plurality of items at a plurality of item locations. Item locations may generally refer to one or more of: a central distribution center, a regional distribution center, a local distribution center, a warehouse, an online order fulfillment center, a retail facility, and the like. In some embodiments, item locations may further include expected inventory from a provider (e.g. manufacturer, distributor, etc.). In some embodiments, item locations may further include items in transit (e.g. on a truck, on a ship). In some embodiments, the inventory database 130 may track locations and quantities of all items offered for sale in a retail company's brick and mortar and/or online store. In some embodiments, the inventory database 130 may further track expected future inventories of items currently in-stock and/or out of stock in the retail company's physical inventory. The inventory information stored in the inventory database 130 may be obtained and/or updated through any conventional inventory tracking means. For examples, movement of items in and out of each item location (e.g. receiving, delivery, sales, loss, etc.) may be recorded by associates and/or an inventory tracking system at each item location. In some embodiments, items may include radio frequency identification (RFID) tags, and periodic RFID tag scans may be performed at one or more item locations to determine/update inventory information. Item sales, lost, shrink, and return information may also be used to determine the current quantity of items at each item location. Generally, the information in the inventory database 130 may be used by the control circuit 110 and/or another online store system to determine the quantities and locations of items within the retail entity's inventory at multiple locations. In some embodiments, the inventory database 130 may comprise a central database that is updated periodically and/or in real-time by the control circuit 110 and/or one or more inventory management systems 150A-C associated with individual item locations. In some embodiments, the inventory database 130 may be implemented at a number of local inventory management systems 150A-C. In some embodiments, the control circuit 110 may be configured to query the inventory databases at a plurality of the inventory management systems 150A-C to aggregate stock information at each location in the system.

The inventory management systems 150A-C may each be associated with at least one item location. The inventory management system 150A generally provides instructions on managing the inventory at the item location (e.g. a central distribution center, a regional distribution center, a local distribution center, a warehouse, an online order fulfillment center, a retail location, etc.) to associates and/or autonomous devices. In some embodiments, the inventory management system 150A may provide instructions regarding movements of items. For example, an inventory management system 150A for a distribution center may provide instructions on items to transfer to another item location, including one or more of item type, item count, destination location, and a shipping schedule such that the correct item and item quantity are loaded onto the correct transport vehicle and/or container. In another example, an inventory management system 150B for a retail facility may provide instructions on item quantities to place on the sales floor vs. the storage area. In some embodiments, the inventory management system may also instruct for items to be transferred away from retail facilities. In some embodiments, the inventory management system 150A may be at least partially located at the item holding location. For example, the inventory management systems 150A-C may include one or more computer systems, user interface devices, autonomous units, semi-autonomous units, item mover systems local to the item holding location. In some embodiments, one or more functionalities of the inventory management systems 150A-C described herein may be at least partially implemented on a central computer system such at the control circuit 110. In some embodiments, the inventory management system 150A-C may be implemented on the same one or more processor-based systems.

In some embodiments, the inventory management systems 150A-C may further track the local inventory at each item location. Each item location may include associates, devices, and/or autonomous units that track the movement of items in and out of the item location. For example, the system may track each received shipment, each sale, each return, each shrink event, each damaged event, etc. In some embodiments, the inventory management systems 150A-B may keep track of the information locally and/or update a centrally maintained inventory database 130. In some embodiments, for inventory management systems associated with retail facilities such as a retail store, a warehouse store, etc. the inventory management system 150A may separately track item counts on the sales floor and item counts in one or more storage areas generally inaccessible to customers.

In some embodiments, one or more of the layaway contract database 120, the inventory database 130, and the memory device coupled to the control circuit 110, and memories coupled to the inventory management systems 150A-C may be implemented on the same one or more memory devices or implemented on two or more separate devices. The layaway contract database 120, the inventory database 130, the memory device coupled to the control circuit 110 may comprise local, remote, networked, and/or cloud based storage accessible by the control circuit 110. In some embodiments, one or more of the layaway contract database 120, the inventory database 130, the control circuit 110, and the inventory management systems 150A-B may be implemented on the same one or more physical devices or on two or more separate devices.

In some embodiments, the system 100 may further include a layaway contract server. The layaway contract server may provide user interfaces to customers to place online layaway orders via one or more of a website, a mobile application, a desktop application, and in-store self-service kiosks. In some embodiments, the layaway contract server may further communicate with in-store terminals that associates use to enter layaway contracts from customers. In some embodiments, the layaway contract server may communicate with one or more of the layaway contract database 120, the inventory database 130, the control circuit 110, and at least one inventory management system to provide the user interface. For example, the layaway contract server may be used to access previously placed layaway orders/contacts stored in the layaway contract database 120. The user may access a previously entered order and may view, modify, make payment, change shipping address, change pick up address, select pickup/ship date, etc. via the provided user interface. The layaway server may further indicate the inventory status (e.g. available, available at a future date, out of stock) of one or more items for purchase via an on-line store based on the information stored in the inventory database 130 and/or one or more of the inventory management systems 150A-C. In some embodiments, the inventory status provided to a customer may be based on the customer's location and/or selected convey location. For example, the system may make items available in the customer's area available for purchase through the layaway program. In some embodiments, for items that are only available outside of the customer's area, the system may charge an extra transfer fee to place these items on layaway. In some embodiments, the layaway server may be configured to provide an earliest available pick/ship date based on the inventory information at one or more locations in proximity of customer selected delivery/pick up location. In some embodiments, the layaway server may be configured to provide terms and conditions (e.g. expiration date, total cost, deposit amount, service fee, etc.) of layaway contracts to customers. In some embodiments, the user interface may ask the customer to enter a convey date and/or location when the layaway contract is created, when a percentage of the cost is paid (e.g. 80%, 90%, etc.), and/or when the last payment is made.

In some embodiments, the system 100 may further include one or more in-store computer systems. The in-store computer system may comprise one or more of a point of sales system, a customer service terminal, a layaway service kiosk, and the like. The in-store computer system may allow a user to retrieve information about their layaway orders and submit payments for their layaway contracts with or without the assistance of a store associate. In some embodiments, the user may also modify details of the layaway contract and/or option via the in-store computer system. For example, a customer may modify shipping options (e.g. ship to address or ship to store for pick up), modify shipping addresses, select or modify convey date, and/or request a price match via the in-store computer system. In some embodiments, the in-store computer system may be configured to accept payments through one or more of credit card, debit card, gift card, cash, and check with or without store clerk assistance. In some embodiments, similar functionalities may be provided to a user via a network accessible user interface such as a website, a mobile application, etc.

Figure 2:
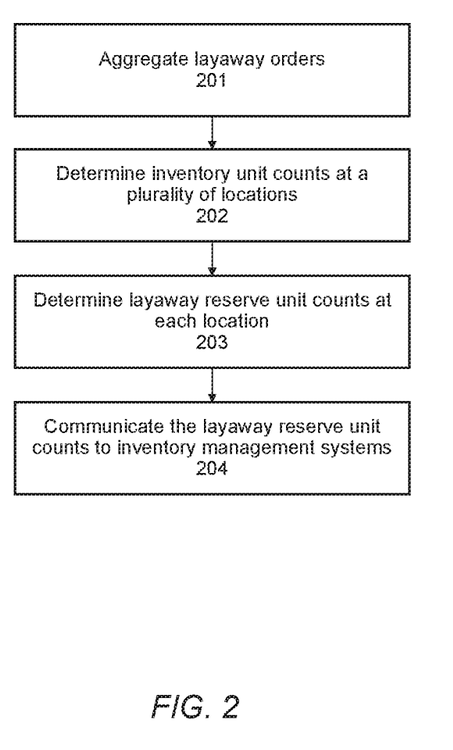
FIG. 2 is a flow diagram of a method in accordance with several embodiments.

Referring now to FIG. 2, a method of dynamic layaway inventory management is shown. In some embodiments, the steps shown in FIG. 2 may be performed by a processor-based device such as the control circuit 110 executing a set of computer readable instructions stored on a computer readable memory.

In step 201, the system aggregates a plurality of layaway contracts. The layaway contracts may be stored in a layaway contract database and may comprise one or more of: online layaway contracts, mobile application layaway contracts, in-store layaway contracts, self-service layaway contracts, etc. A layaway contract may be formed by a customer selecting one or more items to purchase through a layaway program. The selected item may correspond to an item identifier (e.g. barcode, Universal Product Code (UPC), etc.) instead of a specific item unit. For example, if the customer selects an X brand model A bicycle to place on layaway, the layaway contract may be fulfilled by the seller conveying any unit of the X brand model A bicycle. In another example, in the event that a customer brings an item to a store associate to place on layaway, after obtaining the item's information and checking that other units of the item are available at either the store storage or another item location, the item may be returned to the sales floor and made available for purchase by another customer.

Layaway contracts stored in the layaway contract database may comprise layaway contract information such as one or more of: a layaway contract unique identifier, a user identifier, a user account identifier, one or more item identifier corresponding to items selected by the user, a total price for the selected items, a service fee, total payment to date, an expiration date of the order, a convey location, an amount paid, an amount due, etc. For each item type in the system, the system may determine convey locations and convey dates for one or more units of the item placed on layaway. The convey dates may be comprised of an expected convey date of each item unit estimated based on one or more of: a payment amount to date, a user selected date, a holiday (e.g. Christmas, mother's day, etc.), and a layaway contract expiration date. In some embodiments, the convey date may be specified in the layaway contract. For example, the contract may provide that the convey date would be a set number of days (e.g. 3 days, 5 days) after the conditions of the layaway contract are met. In some embodiments, the system may require that the customer specifies a convey date and/or give an advance notice of the intended convey date. The convey location may comprise an in-store pickup location or a delivery address. In some embodiments, in step 201, the system may determine a total layaway contract unit count for each item at a store, in a regional, and/or in the entire retail system. The convey location may generally be selected by the customer during or after the formation of the layaway contract. In some embodiments, the convey location may comprise a pick-up location (e.g. store, merchandise locker, service point, etc.) and/or a delivery address. In some embodiments, in step 201, the system may determine a schedule of item quantities expected to be conveyed at a plurality of locations on a plurality of future dates for a plurality of items.

In step 202, the system determines inventory unit counts of items at a plurality of item locations. In some embodiments, item locations comprise one or more of a warehouse, a storage facility, a distribution center, a retail facility, and a transportation vehicle. In some embodiments, the system may maintain a central inventory database that keeps track of the inventory item counts at various locations operated/managed by a retail entity. In some embodiments, the inventory of at least some item locations may be separately and/or locally maintained, and the system may query the inventory information of items as needed. In some embodiments, the inventory count may include one or more of current inventory and estimated future inventory. For example, the system may add item counts if a location is expected to receive on a future date to estimate a future inventory. In some embodiments, the system may further remove items expected to be sold and/or items that are expiring at a future date to estimate a future inventory.

In step 203, the system determines layaway reserve unit counts for the plurality of item locations. In some embodiments, the layaway reserve unit counts for each of the plurality of locations may be determined based the convey locations and the convey dates for the one or more units of an item aggregated in step 201 and the inventory unit counts of the item at the plurality of item locations determined in step 202. Layaway reserve generally refers to items that are not available to sales and/or delivery to customers and/or other item locations. In some embodiments, the layaway reserve unit counts may be determined based on distributing item units at item locations such that sufficient item units are available for conveyance at conveying locations on convey dates associated with a plurality of layaway contracts. For example, if three units of an item are expected to be picked up from a store the next day, the system may determine that the store should have three units on layaway reserve. In some embodiments, the layaway reserve unit counts may be determined such that additional units arrive at the convey location just prior to the estimated convey date. For example, if three units of an item are expected to be picked up from a store in five days, the system may determine that the regional distribution center should have three units on reserve for the first three days. If the store has sufficient stock to fulfill the layaway request, the reserve unit count may be transferred to the store without transferring the physical units. That is, the reserve count at the distribution center may be set to zero while the store's reserve count may be set to two days before the convey date. If the store does not have sufficient stock to fulfill the layaway order, the system may cause the distribution central to deliver units of the item to the store. For items scheduled to be picked up from a store, the system may reduce the storage needs at retail facilities by using warehouses, storage facilities, distributions, etc. for layaway storage until the items are about to be conveyed. In another example, if five units of item are expected to be shipped out from an online order fulfillment center in two days, and the fulfillment system currently has three units, the system may set the layaway reserve count at the fulfillment system to three units and cause two additional units of the item to be transferred to the fulfillment center from an upstream distribution center and/or storage facility. In some embodiments, the system may further take into account the time required to transfer item units between item locations. For example, if a store currently has ten units of an item and three units of the item are expected to be picked up through the layaway program in ten days, the system may set the store's layaway reserve count for that item to zero if at least three additional units may be transferred to the store location from another location in time for the expected conveyance date.

In some embodiments, the layaway reserve unit count for each of the plurality of item locations is determined such that the sum of the layaway reserve unit counts at the plurality of item locations approximates the total layaway order unit count. For example, if, in aggregate, 100 units of an item have been placed on layaway, the system may ensure that between the various facilities operated by the retail entity, at least 100 units of the item would remain unsold. In some embodiments, the system may take into account an expected future inventory. For example, if five units of an item are expected to be conveyed in ten days, and 100 units of an item are expected to be received from a manufacturer/supplier in two days, the system may hold no units in layaway reserve until the arrival of the shipment from the manufacturer/supplier.

In some embodiments, the layaway reserve unit count for each of the plurality of item locations is further based on storage capacities at each of the plurality of item locations. For example, if only a few items are currently being held in a store's backroom storage, the system may cause a unit to be transferred to the store three days before the expected convey date, and if the backroom storage is nearly full, the system may cause the unit to be transferred a day before the expected convey date. In some embodiments, the layaway reserve unit count generally would not exceed the location's current stock count. In some embodiments, in step 203, the system may further determine items counts to transfer between locations. For example, if three units of an item are expected to be conveyed through layaway programs at a store location and the store currently has no such item in stock, the system may cause a regional distribution center to convey three or more units of the item to the store. In some embodiments, the items delivered to a store may be marked as items in layaway reserve such that store associates are instructed to not place the items on the sales floor. In some embodiments, the system may determine an item location for each layaway unit of the item based on the convey date and distances between the item locations and the convey location. For example, if it takes two days to transfer a shipment from a storage facility to a regional distribution center, and two days to transfer a shipment from a regional distribution center to a retail facility, the number of the units that is expected to convey in six or more days may be included in the layaway reserve unit counts of the storage facility, the number of units that is expected to convey in between 3-5 days may be included in the layaway reserve unit count for the regional distribution center, and units expected to be conveyed in 1-2 days may be included in the layaway reserve unit count of the retail facility.

In step 204, the system communicates the layaway reserve unit counts to inventory management systems associated with a plurality of item locations. In some embodiments, an inventory management system may be configured to adjust the number of available units of the item based on the layaway reserve unit count. In some embodiments, the number of available units of the item corresponds to one or more of a number of units unavailable for purchase by a customer and a number of units unavailable for transfer to another item location. In some embodiments, the inventory management system may comprise one or more of a central computer system of an item location, a computer terminal, a portable user device, and an autonomous or semi-autonomous movable unit. In some embodiments, the inventory management system may comprise devices local and/or remote to the item location. In some embodiments, an inventory management system operates to provide information to store associates and/or device for managing inventory. When an inventory management system receives the layaway reserve unit counts for an item location, the inventory management system may prevent units of an item from being transferred to another item location and/or conveyed to a customer based on the layaway reserve unit count. In some embodiments, the layaway reserve units may be separate from other items and stored in a designated area (e.g. in a layaway storage area). In some embodiments, for a retail facility, the layaway reserve unit count may correspond to the number of units that should stay in the storage area and not placed on the sales floor. For example, if an item is out of stock on the sales floor, the system may prevent associates from restocking the shelves if the restocking would cause the quantity of the item in the storage area to fall below the layaway reserve unit count. If the layaway reserve unit count exceeds the available item quantity in the storage area, the system may further instruct a store associate and/or an autonomous motored unit to move item(s) from the sales floor of the retail facility to a storage area such that the items are no longer available for purchase by an in-store customer.

In some embodiments, for a distribution center, the layaway reserve unit may correspond to units unavailable to be ordered to be shipped to another distribution or retail facility. The layaway reserve count may be used to reduce the number of total units available for transfer to another item location. For example, if a distribution center has 500 units, and the layaway reserve unit count for the item calls for 20 units to be placed in reserve, the system may only make 480 units available for ordering and transfer through the typical item distribution and logistics chain. In some embodiments, the layaway reserve unit in a distribution center and/or storage facility may not be physically separated from the units not in reserve. In some embodiments, the inventory reserve unit count corresponds to a minimum item count that should remain at the item location and does not require individual items to be set aside. For example, if an item location has ten units of an item in reserve and a new shipment of 100 items arrives, the original ten units may be made available for transfers and/or sales along with 90 of the new units, while maintaining the unit layaway reserve unit count with 10 units from the new shipment. In some embodiments, the layaway reserve units may be stored in a separate layaway storage area.

In some embodiments, the system may further determine a transfer unit count and a transfer destination for one or more item locations based on the information determined in steps 201-203. Transfer instructions may be provided based on the item location's proximity to the convey location and the proximity to the convey date. For example, the system may instruct for 5 of the 10 layaway reserve units to be transferred from a central distribution center to a regional distribution center and/or fulfillment center in anticipation of an upcoming convey date such that the item may be available to the customer when and/or shortly after the conditions of the layaway contract is fulfilled. In some embodiments, the transfer unit counts may combine layaway and non-layaway item units. The system may maintain the layaway reserve counts determined in step 203 through determining the appropriate transfer unit counts for transfer to other item locations. In some embodiments, the layaway reserve unit count may be moved between item locations without physically transferring units of the item. For example, if a distribution center and a store served by the distribution center both have sufficient stock to fulfill a layaway contract, the reserve unit count associated with an order may be assigned to the distribution center initially, making the units of the item at the store available for sales to in-store customers. As the convey date approaches, if the store still has sufficient stock to fulfill the layaway contract, the reserve unit count may be shifted to the store without transferring physical units of the item. In some embodiments, the system may cause units of the item to be transferred to the store if the store will not have sufficient stock to fulfill the layaway contract on the convey date.

Figure 3:
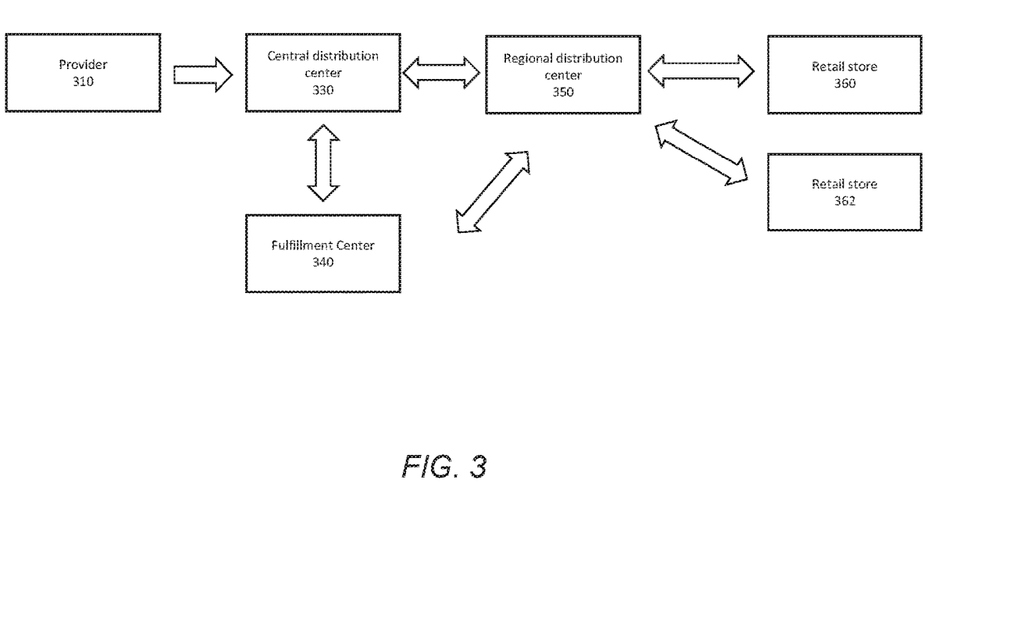
FIG. 3 is a diagram of an item distribution system in accordance with several embodiments.

Next referring to FIG. 3, an example of a distribution chain of a retail entity is shown. A retail entity may own, operate, and/or manage various points in a distribution chain to provide items to customers. A provider 310 first provides an item to the retail entity. The provider 310 may comprise a manufacturer and/or a distributor. Generally, the retail entity places orders with the provider, receives an expected delivery date, and receives the shipment at a central distribution center 330. A retail entity may include one or more central distribution centers 330 that stores and/or routes items to other item locations. The retail entity may further include regional distribution centers 350 that serves retail stores 360 and 362 in a region (e.g. Dallas metro area, Northern California, New England, etc.). While two tiers of the distribution system are shown in FIG. 3, distribution centers may be organized in any hierarchical or non-hierarchical form. In some embodiments, the retail entity may further include one or more fulfillment centers 340 for processing delivery orders (e.g. online orders, mail orders, etc.). In some embodiments, the central distribution center 330, the fulfillment center 340, the regional distribution center 350, and other storage facilities may be collectively referred to as distribution centers. FIG. 3 is provided as an example only. A retail entity may have any number of providers 310 and may include any number of distribution centers, fulfillment centers, and retails stores. In some embodiments, the distribution chain may further include other third-party operated/managed distribution centers and/or points of sales.

In some embodiments, with the systems and methods described herein, for a plurality of items offered for sales by the retail entity, the system may keep track of inventory item counts at each of the central distribution centers 330, fulfillment centers 340, regional distribution centers 350, and/or retail stores 360 and 362. When items are placed on layaway by customers either in-store or through a network accessible user interface, the system may determine where to hold units of the item on reserve based on the convey locations and convey dates associated with the layaway orders. Generally, retail stores 360 and 362 have less storage capacity than distribution centers. In some cases, central distribution centers 330 may have a greater storage capacity as compared to regional distribution centers. In some embodiments, the layaway reserve unit count may be maintained at the central distribution center 330 until the expected convey date is approaching. As the convey date for a contract draws closer, the layaway reserve unit count corresponding to the order may be moved down the distribution chain towards a retail store for in-store pickup orders or towards a central and/or regional fulfillment center 340 for delivery orders. In some embodiments, if a downstream item location has sufficient stock to meet the layaway reserve unit count, the reserve unit count may be moved without moving physical units of the item. In some embodiments, if a downstream item location does not have sufficient stock to hold on reserve, the system may further cause items to be transferred between item locations. In some embodiments, if insufficient quantities of an item are available at a distribution center, the system may instruct retail stores 360 and 362 and/or fulfillment centers 340 to route available items back to the distribution centers such that the item may be used to fulfill layaway orders via another item location. For example, if the only remaining units of an item is located at retail store 362, and a customer requests to pick-up that item at retail store 360, the inventory management system of the retail store 362 may cause the items to be transferred to the retail store 360 either directly or via one or more distribution centers. In some embodiments, the distribution center may hold such items in its storage, and only transfer the item to the retail store 360 shortly prior to the convey date. In some embodiments, the system may include expected delivery from one or more providers 310 in determining future inventory at one or more locations. For example, if 100 units of an item are expected to be delivered from a provider 310 in ten days and 20 units are expected to be conveyed via a layaway contract in 20 days, the system may consider 20 units of the expected item to be in layaway reserve, instead of including those 20 units in one of the item locations holding inventory for the retail entity.

Figure 4:
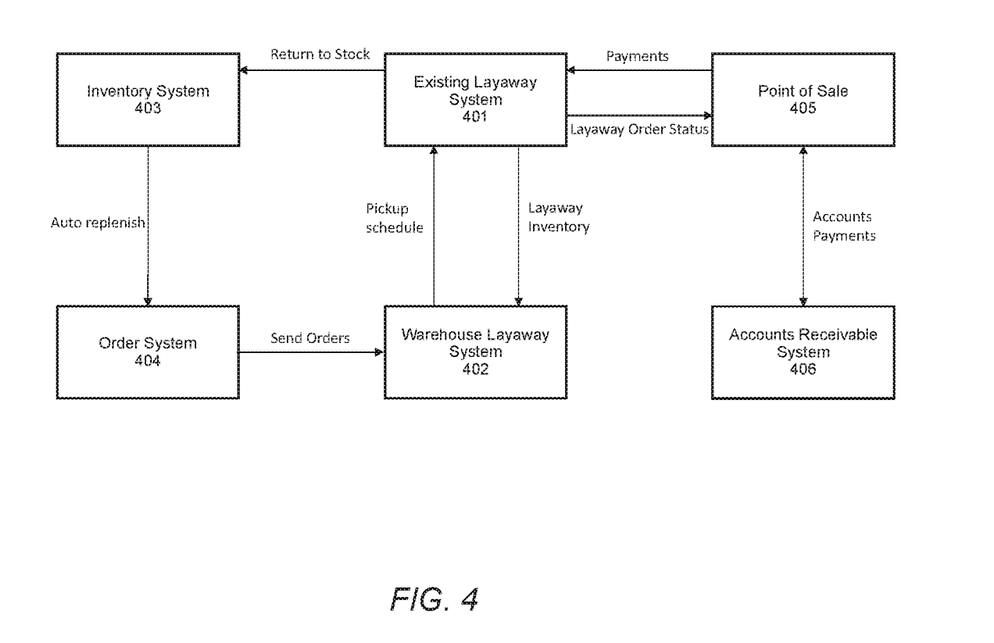
FIG. 4 is a system diagram in accordance with several embodiments.

Referring now to FIG. 4, a systems integration diagram for dynamic layaway inventory management is shown. In some embodiments, one or more of the systems shown in FIG. 4 may collectively and/or individually implement one or more methods described herein. The overall system comprises an existing layaway system 401, a warehouse layaway system 402, an inventory system 403, an order system 404, a point of sale system 405, and an accounts receivable system 406.

In some embodiments, the existing layaway system 401 may comprise a layaway order management system for one or more stores. The existing layaway system 401 may create, store, and update layaway contracts associated with one or more store locations. When a customer submits a payment via the point of sale system 405, the point of sale system 405 may retrieve layaway order status information from the existing layaway system 401 to verify payment and update the existing layaway system 401 with payment information. In some embodiments, the point of sale system 405 may further provide the payment information to the accounts receivable system 406 for the store.

The warehouse layaway system 402 may be configured to manage warehouse inventory based on communicating with the existing layaway system 401. In some embodiments, warehouses managed by the warehouse layaway system 402 may comprise non-retail item storage locations. The systems may determine the item holding locations and quantities in the warehouse system based on orders stored at the existing layaway system 401. In some embodiments, the warehouse layaway system 402 may further be configured to provide a pickup schedule to the existing layaway system 401 based on inventories at warehouses and item storage locations. In some embodiments, the warehouse layaway system 402 may predictively send items to the store inventory system 403 based on the amount of payment received for layaway contracts.

The inventory system 403 may comprise the inventory management system of a store location. When a customer brings an item to place on layaway, the system may return the item back to the inventory system 403 after the layaway contract is created. The specific item may be placed on the sales floor and be sold to another customer. The inventory system 403 may monitor stock levels for a plurality of items and automatically send a replenishment request to the order system 404. The order system 404 may then generate an order for the warehouse layaway system 402 for replenishment items.

In some embodiments, the existing layaway system 401, the warehouse layaway system 402, the inventory system 403, the order system 404, the point of sale system 405, and the accounts receivable system 406 may comprise one or more processor-based systems including at least a processor and a memory. In some embodiments, the one or more of the existing layaway system 401, the warehouse layaway system 402, the inventory system 403, the order system 404, the point of sale system 405, and the accounts receivable system 406 may comprise user interface devices for user input/output and system configuration. In some embodiments, one or more of the existing layaway system 401, the warehouse layaway system 402, the inventory system 403, the order system 404, the point of sale system 405, and the accounts receivable system 406 may be separately implemented on physical devices communicating with each other on a network. In some embodiments, one or more of the existing layaway system 401, the warehouse layaway system 402, the inventory system 403, the order system 404, the point of sale system 405, and the accounts receivable system 406 may comprise hardware and/or software modules implemented on one or more shared physical devices.

In one embodiment, a system for dynamic layaway inventory management comprises: a layaway contract database, an inventory database, and a control circuit communicatively coupled to the layaway contract database, the inventory database, and the plurality of inventory management systems. The control circuit being configured to periodically: aggregate a plurality of layaway contracts in the layaway contract database to determine convey locations and convey dates for one or more units of an item, determine inventory unit counts of the item at a plurality of item locations based on inventory information stored in the inventory database, determine a layaway reserve unit count for each of the plurality of item locations based on the convey locations and the convey dates for the one or more units of the item and the inventory unit counts of the item at the plurality of item locations, and communicate the layaway reserve unit count for each of the plurality of item locations to one or more inventory management systems of the plurality of item locations to cause a number of available units of the item to be adjusted based on the layaway reserve unit count.

In one embodiment, a method for dynamic layaway inventory management comprises: aggregating a plurality of layaway contracts in a layaway contract database to determine convey locations and convey dates for one or more units of an item, determining inventory unit counts of the item at a plurality of item locations based on inventory information stored in an inventory database, determining a layaway reserve unit count for each of the plurality of item locations based on the convey locations and the convey dates for the one or more units of the item and the inventory unit counts of the item at the plurality of item locations, and communicating the layaway reserve unit count for each of the plurality of item locations to one or more inventory management systems of the plurality of item locations to cause a number of available units of the item to be adjusted based on the layaway reserve unit count.

In one embodiment, an apparatus for dynamic layaway inventory management comprises: a non-transitory storage medium storing a set of computer readable instructions; and a control circuit configured to execute the set of computer readable instructions which causes to the control circuit to periodically: aggregate a plurality of layaway contracts in a layaway contract database to determine convey locations and convey dates for one or more units of an item, determine inventory unit counts of the item at a plurality of item locations based on inventory information stored in an inventory database, determine a layaway reserve unit count for each of the plurality of item locations based on the convey locations and the convey dates for the one or more units of the item and the inventory unit counts of the item at the plurality of item locations, and communicate the layaway reserve unit count for each of the plurality of item locations to one or more inventory management systems of the plurality of item locations to cause a number of available units of the item to be adjusted based on the layaway reserve unit count.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for dynamic layaway inventory management comprises:
a point of sale system configured to permit a customer to place a layaway order;
a layaway contract server configured to:
provide a graphical user interface configured to permit the customer to place, via one or more of a website, a mobile application, a desktop application, and a self-service kiosk, the layaway order with the point of sale system;
provide, based on the layaway order placed by the customer with the point of sale system, a layaway contract, the point of sale system being configured to forward the layaway contract over a network to a layaway contract database;
a layaway contract database storing a plurality of layaway contracts received from a plurality of point of sale systems;
an inventory database storing the plurality of layaway contracts received from the plurality of point of sale systems;
a plurality of inventory management systems each associated with an item location of a plurality of item locations, wherein the plurality of item locations comprises retail stores and upstream distribution centers; and
a control circuit communicatively coupled to the layaway contract database, the inventory database, and the plurality of inventory management systems, the control circuit being configured to periodically:
aggregate the plurality of layaway contracts received from the plurality of point of sale systems in the layaway contract database;
determine convey locations and convey dates for one or more units of an item in the plurality of layaway contracts;
determine inventory unit counts of the item at the plurality of item locations based on inventory information stored in the inventory database;
determine a layaway reserve unit count to be held at each of the plurality of item locations, including at least one retail store and at least one upstream distribution center, based on the convey locations and the convey dates for the one or more units of the item in the plurality of layaway contracts and the inventory unit counts of the item at the plurality of item locations;
communicate the layaway reserve unit count for each of the plurality of item locations to one or more inventory management systems of the plurality of item locations, wherein each inventory management system is configured to determine a number of units of the item available for purchase by the customer or transfer to another location based on the layaway reserve unit count;
in the event that a retail store has sufficient stock of an item to meet the layaway reserve unit count of the item determined for the retail store, transfer layaway reserve unit counts from an upstream distribution center to the retail store without transferring physical units of the item to the retail store; and
in the event that the retail store does not have sufficient stock to meet the layaway reserve unit count of the item, cause physical units of the item to be transferred from the upstream distribution center to the retail store based on the difference between the stock at the retail store and the layaway reserve unit count of the item determined for the store.

2. The system of claim 1, wherein the plurality of item locations comprises one or more of a warehouse, a storage facility, a distribution center, a retail facility, and a transportation vehicle.

3. The system of claim 1, wherein the number of available units of the item corresponds to one or more of a number of units unavailable for purchase by the customer and a number of units unavailable for transfer to another item location.

4. The system of claim 1 wherein the inventory unit counts of a retail location comprise items in a backroom storage and items on a sales floor.

5. The system of claim 1, wherein the control circuit is further configured to determine a total layaway contract unit count based on the plurality of layaway contracts in the layaway contract database, and the layaway reserve unit count for each of the plurality of item locations is determined such that a sum of the layaway reserve unit counts at the plurality of item locations approximates the total layaway contract unit count.

6. The system of claim 1, wherein the determining of the layaway reserve unit counts for each of the plurality of item locations is further based on an expected future inventory of the item at the plurality of item locations.

7. The system of claim 6, wherein the expected future inventory of the item corresponds to expected arrival of a shipment of the item from one or more of a manufacturer and a distributor.

8. The system of claim 1, wherein the determining of the layaway reserve unit count for each of the plurality of item locations is further based on a storage capacity at each of the plurality of item locations.

9. The system of claim 1, wherein the control circuit is further configured to determine a transfer unit count and a transfer destination for at least one of the plurality of item locations based on the convey locations and the convey dates of the one or more units of the item.

10. The system of claim 1, wherein the convey dates for one or more units of the item comprises an estimated convey dates determine based on one or more of a payment amount of an associated layaway contract, a user selected date, a holiday, and a layaway contract expiration date.

11. A method for dynamic layaway inventory management comprises:
providing, via a layaway contract server, a graphical user interface configured to permit a customer to place, via one or more of a website, a mobile application, a desktop application, and a self-service kiosk, a layaway order with a point of sale system;
providing, via the layaway contract server and based on the layaway order placed by the customer with the point of sale system, a layaway contract;
forwarding, from the point of sale system and over a network, the layaway contract to a layaway contract database;
aggregating a plurality of layaway contracts received from a plurality of point of sale systems and stored in the layaway contract database;
determining convey locations and convey dates for one or more units of an item;
determining inventory unit counts of the item at the plurality of item locations based on inventory information stored in an inventory database;
determining a layaway reserve unit count to be held at each of the plurality of item locations, including at least one retail store and at least one upstream distribution center, based on the convey locations and the convey dates for the one or more units of the item in the plurality of layaway contracts and the inventory unit counts of the item at the plurality of item locations;
communicating the layaway reserve unit count for each of the plurality of item locations to one or more inventory management systems of the plurality of item locations, wherein each inventory management system is configured to determine a number of units of the item available for purchase by the customer or transfer to another location based on the layaway reserve unit count;
in the event that a retail store has sufficient stock of an item to meet the layaway reserve unit count of the item determined for the retail store, transferring layaway reserve unit counts from an upstream distribution center to the retail store without transferring physical units of the item to the retail store; and
in the event that the retail store does not have sufficient stock to meet the layaway reserve unit count of the item, causing physical units of the item to be transferred from the upstream distribution center to the retail store based on the difference between the stock at the retail store and the layaway reserve unit count of the item determined for the store.

12. The method of claim 11, wherein the plurality of item locations comprises one or more of a warehouse, a storage facility, a distribution center, a retail location, and a transportation vehicle.

13. The method of claim 11, wherein the number of available units of the item corresponds to one or more of a number of units unavailable for purchase by the customer and a number of units unavailable for transfer to another item location.

14. The method of claim 11 wherein the inventory unit counts of a retail location comprise items in a backroom storage and items on a sales floor.

15. The method of claim 11, further comprising:
determining a total layaway contract unit count based on the plurality of layaway contracts in the layaway contract database;
wherein the layaway reserve unit count for each of the plurality of item locations is determined such that a sum of the layaway reserve unit counts at the plurality of item locations approximate the total layaway contract unit count.

16. The method of claim 11, wherein the determining of the layaway reserve unit counts for each of the plurality of item locations is further based on an expected future inventory of the item at the plurality of item locations.

17. The method of claim 16, wherein the expected future inventory of the item corresponds to expected arrival of a shipment of the item from one or more of a manufacturer and a distributor.

18. The method of claim 11, wherein the determining of the layaway reserve unit count for each of the plurality of item locations is further based on a storage capacity at each of the plurality of item locations.

19. The method of claim 11, further comprising: determining a transfer unit count and a transfer destination for at least one of the plurality of item locations based on the convey locations and the convey dates of the one or more units of the item.

20. The method of claim 11, wherein the convey dates for one or more units of the item comprise an estimated convey dates determine based on one or more of: a payment amount of an associated layaway contract, a user selected date, a holiday, and a layaway contract expiration date.

21. A system for dynamic layaway inventory management comprises:
    a point of sale system configured to permit a customer to place a layaway order;
    a layaway contract server configured to:
        provide a graphical user interface configured to permit the customer to place, via one or more of a website, a mobile application, a desktop application, and a self-service kiosk, the layaway order with the point of sale system;
        provide, based on the layaway order placed by the customer with the point of sale system, a layaway contract, the point of sale system being configured to forward the layaway contract over a network to a layaway contract database;
    a non-transitory storage medium storing a set of computer readable instructions; and
    a control circuit configured to execute the set of computer readable instructions which causes to the control circuit to periodically:
        aggregate a plurality of layaway contracts received from a plurality of point of sale systems and stored in the layaway contract database;
        determine convey locations and convey dates for one or more units of an item;
        determine inventory unit counts of the item at the plurality of item locations based on inventory information stored in an inventory database;
        determine a layaway reserve unit count to be held at each of the plurality of item locations, including at least one retail store and at least one upstream distribution center, based on the convey locations and the convey dates for the one or more units of the item in the plurality of layaway contracts and the inventory unit counts of the item at the plurality of item locations;
    communicate the layaway reserve unit count for each of the plurality of item locations to one or more inventory management systems of the plurality of item locations, wherein each inventory management system is configured to determine a number of units of the item available for purchase by the customer or transfer to another location based on the layaway reserve unit count;
    in the event that a retail store has sufficient stock of an item to meet the layaway reserve unit count of the item determined for the retail store, transfer layaway reserve unit counts from an upstream distribution center to the retail store without transferring physical units of the item to the retail store; and
    in the event that the retail store does not have sufficient stock to meet the layaway reserve unit count of the item, cause physical units of the item to be transferred from the upstream distribution center to the retail store based on the difference between the stock at the retail store and the layaway reserve unit count of the item determined for the store.

\* \* \* \* \*